(12) United States Patent
Claus et al.

(10) Patent No.: US 7,066,750 B2
(45) Date of Patent: Jun. 27, 2006

(54) CONNECTION PIECE FOR A FLUID LINE

(75) Inventors: Hans-Jürgen Claus, Stuttgart (DE);
Klaus Zoller, Stuttgart (DE);
Hans-Walter Brenner, Stuttgart (DE);
Wolf-Dieter Kerscher, Kircheim (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/519,854

(22) PCT Filed: Jul. 9, 2003

(86) PCT No.: PCT/EP03/07364

§ 371 (c)(1),
(2), (4) Date: Dec. 29, 2004

(87) PCT Pub. No.: WO2004/018922

PCT Pub. Date: Mar. 4, 2004

(65) Prior Publication Data

US 2005/0260889 A1 Nov. 24, 2005

(30) Foreign Application Priority Data

Aug. 20, 2002 (DE) ............................... 102 37 976

(51) Int. Cl.
*H01R 4/60* (2006.01)
(52) U.S. Cl. ...................... 439/194; 439/427
(58) Field of Classification Search ............... 439/178, 439/179, 190, 194, 393, 426, 427, 440, 395, 439/389, 425, 404; 174/21 R
See application file for complete search history.

(56) References Cited

U.S. PATENT DOCUMENTS

| 4,675,780 A | | 6/1987 | Barnes et al. ............... 361/215 |
|---|---|---|---|
| 4,842,544 A | * | 6/1989 | Birch et al. ................. 439/387 |
| 5,522,733 A | * | 6/1996 | White et al. ................ 439/395 |
| 5,810,616 A | * | 9/1998 | Ivey ........................... 439/395 |
| 6,641,426 B1 | * | 11/2003 | Saitoh ........................ 439/395 |
| 6,670,880 B1 | * | 12/2003 | Hall et al. .................. 336/132 |
| 6,676,436 B1 | * | 1/2004 | Gaidosch .................... 439/393 |
| 6,783,379 B1 | * | 8/2004 | Kerscher et al. ............ 439/191 |
| 6,848,924 B1 | * | 2/2005 | Frisch ........................ 439/191 |
| 2004/0256127 A1 | * | 12/2004 | Brenner et al. ........... 174/21 R |

FOREIGN PATENT DOCUMENTS

| DE | 201 19 352 U1 | 3/2002 |
|---|---|---|
| WO | 02/37012 A1 | 5/2002 |

* cited by examiner

*Primary Examiner*—Hae Moon Hyeon
(74) *Attorney, Agent, or Firm*—Hoffmann & Baron, LLP

(57) ABSTRACT

A connection member for a fluid line (2) defining a fluid duct (5) with stranded signal conductors (7a and 7b) in the wall (4) thereof for the transmission of electrical signals. The connection member has a female socket into which the fluid line (2) may be inserted and in which at least one signal contact (26a and 26b) is arranged, which at the end may stick into the at least one signal conductor (7a and 7b). The penetrating part (27) is constituted by a knife edge (27a) whose width is equal to the diameter of the signal conductor (7a and 7b) to be contacted and which splits the signal conductor 7a and 7b) on penetration from the end into an outer and an inner line limb.

18 Claims, 4 Drawing Sheets

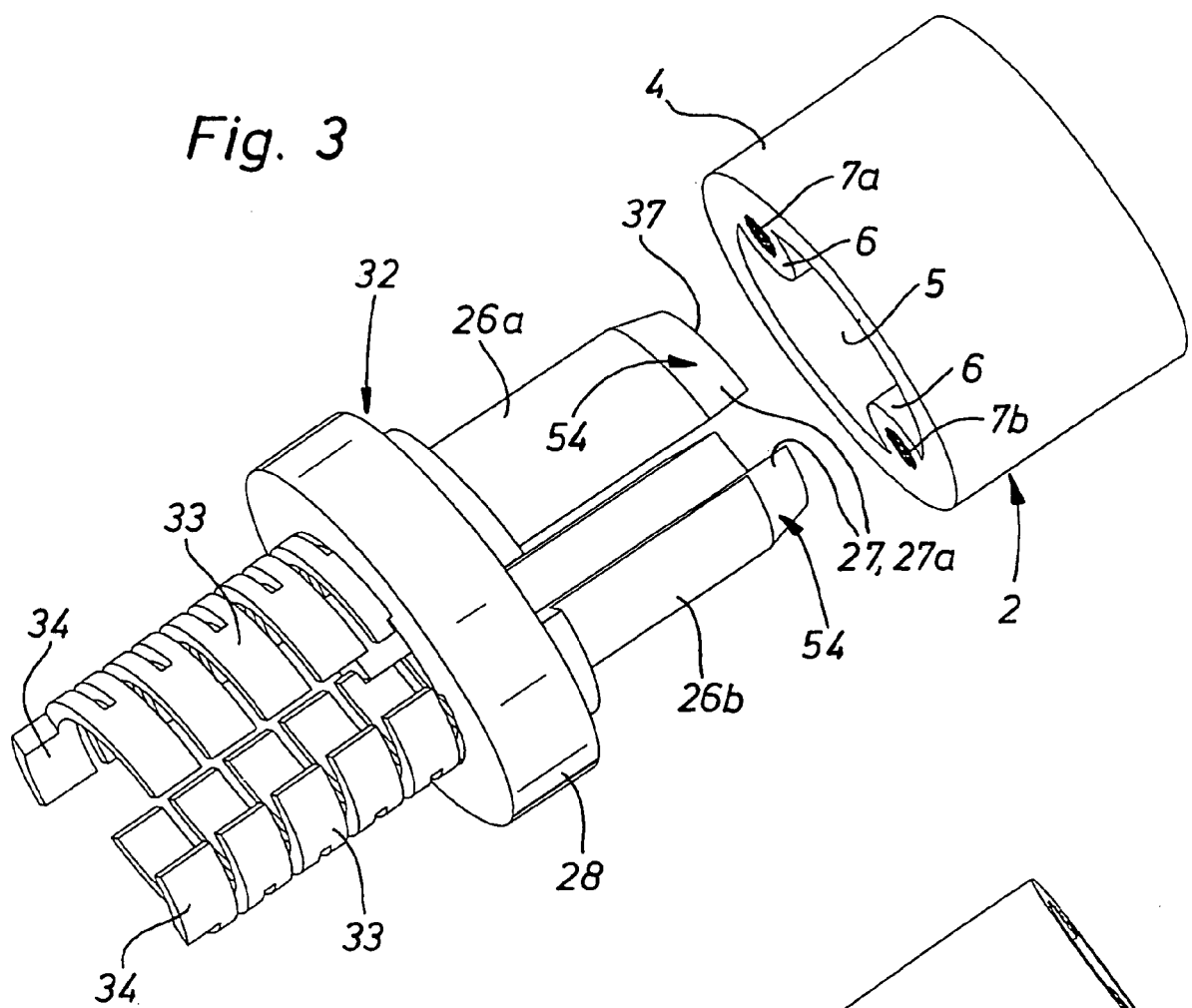
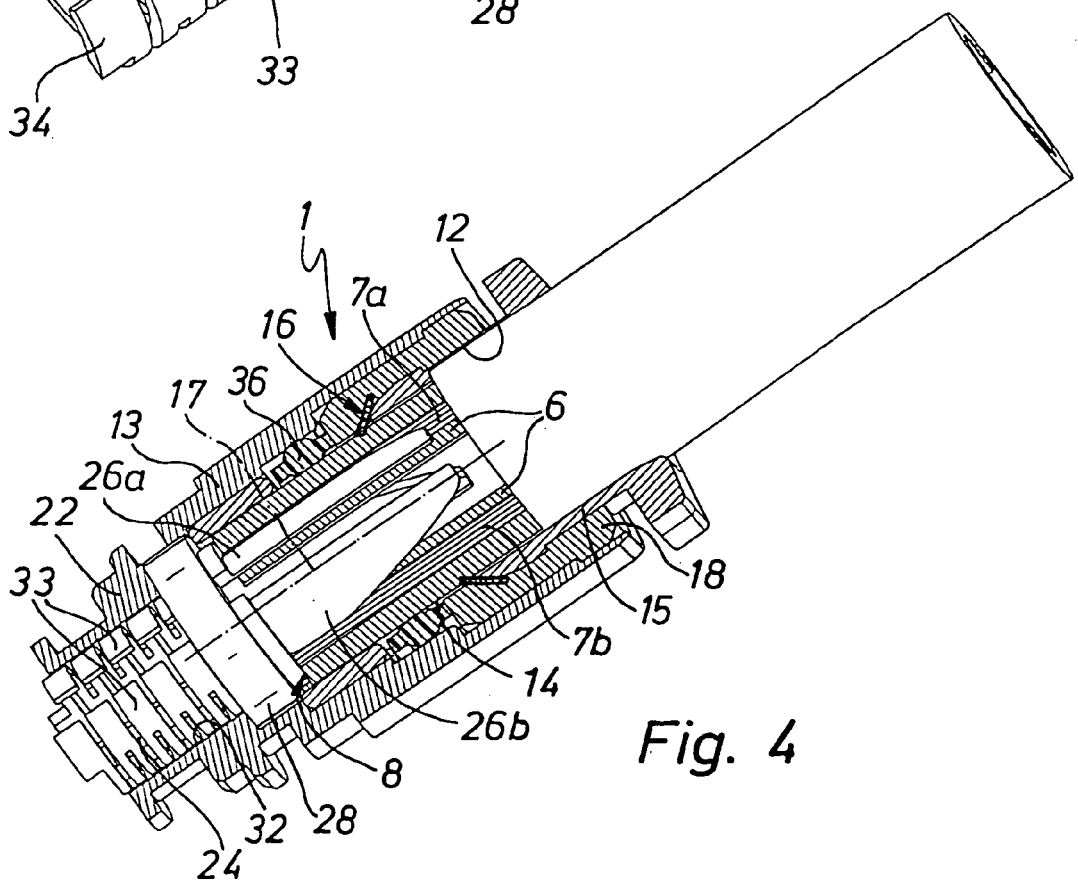

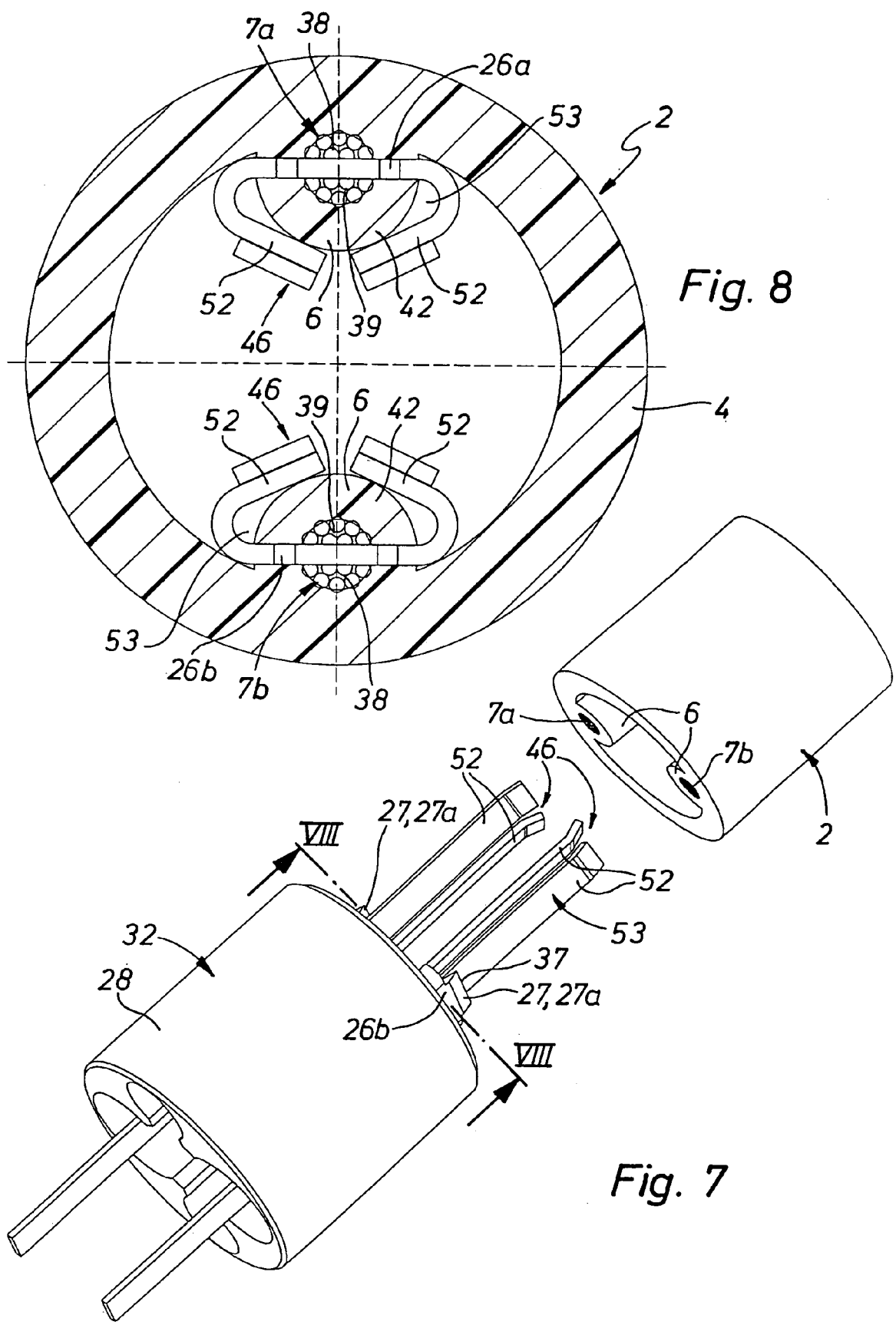

CONNECTION PIECE FOR A FLUID LINE

CROSS-REFERENCE TO RELATED APPLICATIONS

This application claims priority based on an International Application filed under the Patent Cooperation Treaty, PCT/EP03/07364, filed on Jul. 9, 2003, and German Patent Application No. DE 102 37 976.9, filed on Aug. 20, 2002.

FIELD OF THE INVENTION

The invention relates to a connection member for a fluid line containing a fluid duct, in whose wall at least one stranded signal conductor provided for the transmission of electrical signals extends, comprising a female socket, having an insertion opening, for the insertion of the fluid line, a holding device for holding the inserted fluid line and at least one signal contact arranged in the female socket and extending toward the insertion opening, said signal contact having a male part adapted to stick into a signal conductor on insertion of the fluid line with the production of an electrical connection.

BACKGROUND OF THE INVENTION

A known connection member of this type disclosed in the German patent publication (utility model) 20,119,352 U1 possesses two pin-like signal contacts, which on insertion of a fluid line centrally stick into the end side of the respectively associated signal conductor. In order to ensure that in this case a reliable electrical connection is produced at all times the fluid line must be set at an extremely accurate angular position on insertion. Such positioning is aided by a guide means setting the angular position of the fluid line, whose efficacy however is dependent on extremely exact manufacture with tight tolerances. This is a disadvantage as regards production costs.

SUMMARY OF THE INVENTION

One object of the present invention is to provide a connection member of the type initially mentioned, which ensures making reliable electrical contact even in the case of significant manufacturing tolerances resulting from economies in production.

In order to achieve this object there is a provision such that the male part of the at least one signal contact is constituted by a knife edge, whose width is equal to at least the diameter of the signal conductor to be contacted and which on penetration from the end is adapted to split the signal conductor into an externally placed and an internally placed line limb.

It is in this manner that electrical contacting takes place with a substantially higher performance as regards hitting the mark. Even if the connection member lacks special guide means for indicating the angular position of the fluid line and insertion of the fluid line takes place as judged by eye on the basis of a marking provided on the fluid line, it is possible for reliable electrical connection to be ensured. The larger the width of the knife edge, the greater the reliability of making contact and the larger the manufacturing tolerances, which may be allowed.

In this context the configuration of the tool as a knife edge leads to a large size of contact face, because the line limbs produced by splitting of the stranded signal conductor may engage the signal contact over a substantial area.

More particularly if the knife edge is equal in size to the diameter of the signal conductor to be contacted is only slightly larger than it, the knife edge, as viewed from the end, may be straight in design. In this case it preferably extends in parallelism to a tangent to the periphery of the female socket. If on the contrary a larger width of the knife edge is to be provided, it is best to have a circularly arcuate cutting edge shape as seen in an end-on view. The knife edge can then certainly extend along a larger part of the periphery of the female socket. If the connection member is designed with two signal contact, which are diametrally opposite to one another, the knife edges may extend over an angle of up to approximately 180 degrees and preferably around 150 degrees.

If the knife-like edge has a cutting flank extending obliquely inward toward the knife edge, the fluid line, which is preferably manufactured of flexible plastic material, is splayed outward after penetration of the knife edge so that there is a contact pressure between the knife edge and the externally placed conductor limb.

The knife edge may, as seen looking radially, have a linear course at a right angle to the longitudinal axis of the female socket. In this case it may however be necessary to exert a relatively heavy insertion force on the fluid line in order to cause the desired penetration of the knife edge into the wall of the fluid line and the stranded signal conductor. More particularly, if the material of the fluid line has a high strength, it is then best to have a design of the knife edge such that, looking in the radial direction, it has a concavely curved and/or V-like shape. The latter possibility is more particularly advantageous if the electrical signal conductor to be contacted extends at least partially into the fluid line's rib-like wall section, which projects inward and is adjacent in the peripheral direction. In this case on insertion of the fluid line the knife edge does not cut in an end-on direction but gradually from the side into the rib-like wall section so that less force is necessary for cutting.

If required the connection member may be fitted with guide means, which aid in insertion of the fluid line with the desired angular orientation. To realize such guide means at least one signal contact may have two guide wings projecting past the knife edge toward the insertion opening on mutually opposite sides, such wings defining a guide gap becoming wider toward insertion opening. The fluid line is then so mounted that any rib-like wall section thereof assumes a position in the guide gap and is centered, as the depth of insertion increases, by the guide gap until it reaches the desired angular orientation.

A further advantageous design is such that at least one signal contact is provided with at least one support wing arranged adjacent to the knife edge, such wing, in the inserted state of the fluid line, fitting under the radially inwardly thrust conductor limb to thrust it against the signal contact. If at least two such support wings are present, which as seen end-on, have a V-like configuration with a V-like opening facing the signal conductor, it is at the same time possible to provide a guide, which again favors insertion of the fluid line with a given angular position.

In accordance with a further advantageous design the at least one signal contact is mounted for sliding movement in the direction of the longitudinal axis of the female socket, it cooperating with spring means effective of the direction of the insertion opening. This means that the signal contact may readily follow the small longitudinal movements of the fluid line in the connection member when the fluid line is inserted. In this respect it is aided by the spring means, which act on it in the direction of the fluid line. It is in this manner that undesired relative movements between the signal conductor and the signal contact are opposed, which would otherwise impair the quality of the electrical connection.

In the following the invention will be described in more detail with reference to the accompanying drawings.

BRIEF DESCRIPTION OF THE DRAWINGS

FIG. 3 shows the signal contact arrangement employed in the connection member of FIGS. 1 and 2 and furthermore a fluid line, which is to be connected, in a separate representation.

FIG. 4 shows a further working embodiment of the connection member of the invention in a manner of representation as in FIG. 1.

FIG. 7 shows the separately depicted signal contact arrangement of a further working example of the connection member in accordance with the invention together with the end section of a fluid line to be connected.

FIG. 8 shows a cross section taken through the arrangement of FIG. 7 near the signal contacts in a condition in which the fluid line is connected.

DETAILED DESCRIPTION OF THE PREFERRED EMBODIMENTS

Figure 1:
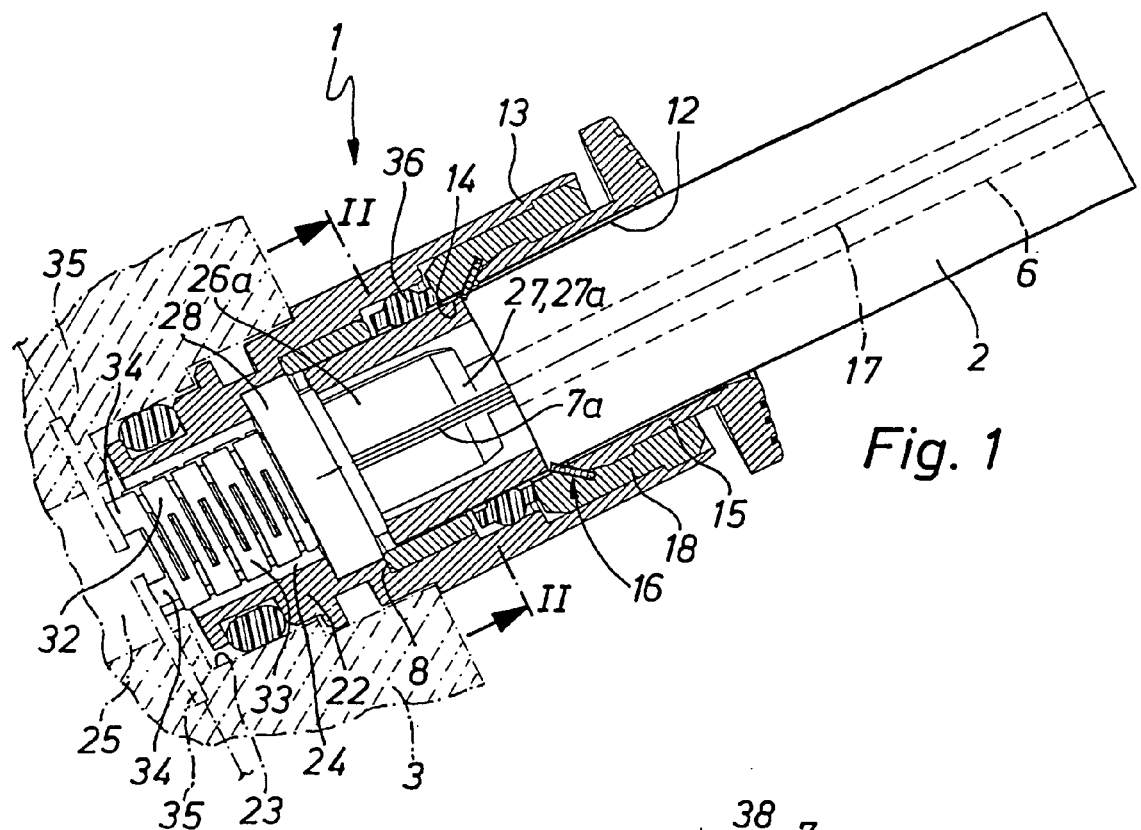
FIG. 1 shows a first working example of the connection member in accordance with the invention in a longitudinal section, one connected fluid line being illustrated partly broken away and one component fitted with the connection member being indicated in chained lines diagrammatically.

FIG. 1 shows a connection member 1, using which a fluid line 2 may be connected with a fluid power component 3. The fluid power component 3 is for example a valve or a drive to be operated by fluid-power.

An alternative design of the connection member 1 appears in FIG. 4. FIGS. 7 and 8 show components in a third working example of a connection member 1 in a partial view thereof. The following description will apply for all embodiments in the absence of any indication to the contrary.

The fluid line 2 able to be connected with the connection member is constituted by hose and consists of flexible, preferably rubber-elastic material. It is convenient to use an elastomer here.

The fluid line 2 has a wall 4, which surrounds at least one fluid duct 5. In the working embodiment the wall 4 has an external circular outline. The internal outline is also circular apart from two diametrally opposite projections. The above mentioned projections are due to a respective rib-like wall section 6 of the wall 4, which projects radially inward in relation to the wall portions which are adjacent in the peripheral direction.

In the wall 4 there is preferably one and more especially several stranded signal conductors 7a and 7b. Same consist of conductive material, as for example copper, and are preferably made up of several individual conductors. The signal conductors 7a and 7b extend in the longitudinal direction of the fluid line 2 along the entire length thereof.

In the working embodiment the signal conductors 7a and 7b are integrated with the wall 4 at the projections 6. With the greater part of their cross section they respectively extend within one of the rib-like wall sections 6. With the aid of such rib-like wall sections 6 there is amongst other things the possibility of simple connection with the connection member 1 while ensuring a predetermined angular orientation.

The fluid line 2 is able to be simply cut to length at any desired point. The signal conductors 7a and 7b then terminate generally flush with the essentially planar end face of the fluid line 2.

For the connection of the connection member 1 the fluid line 2 is inserted through an insertion opening 12 into a female socket 14 defined by the housing 13 of the connection member 1. Then the fluid line 2 extends into a release ring 15 placed at the insertion opening 12 and serving for detachment as required of a holding device 16.

The holding device 16 fixed to the housing has elastically flexible teeth or claws extending peripherally into the female socket 14 which are inclined in relation to the longitudinal axis 17 of the female socket 14 and which are supported in a holding ring 18 secured to the housing 13. On insertion of the fluid line 2 the teeth or claws are shifted radially outward and come to rest on the outer periphery of the fluid line 2. Accordingly, they oppose any forces, which tend to shift the fluid line 2 out of the female socket 14.

The holding device 16 detachably fixes fluid line 2 in position. The release ring 15 may be shifted axially into the interior of the female socket 14 by manual operation so that it moves the teeth or claws of the holding device 16 clear of the outer periphery of the fluid line 2 and accordingly same may be drawn out again.

Adjacent to the rear end portion, opposite to the insertion opening 12 the housing 13 in the connection member 1 is provided with an attachment section 22, using which the connection member 1 may be secured or attached in a socket 23 in the fluid power component 3 with a sealing effect. A fluid duct 24 extends through the attachment section 22 and at one end communicates with the female socket 14 and at the other end opens at the attachment section 22 at the back. In the condition fixed to the fluid power component 3 this fluid duct 24 communicates with a further fluid duct 25 extending in such component 3 so that all in all a fluid connection is produced between this further fluid duct 25 and the fluid duct 5 in the inserted condition of the fluid line 2.

Departing from the illustrated working example it is possible for the connection member 1 also to be an integral part of the fluid power component 3. More especially the housing 13 can be an integral part of the fluid power component 3.

A number of signal contacts 26a and 26b equal to the number of signal conductors 7a and 7b is arranged in the female socket 14. They are secured to the floor of the female socket 14 in a manner fixed in relation to the housing and extend thence axially in the direction of the insertion opening 12. On the side facing the insertion opening 12 each signal contact 26a and 26b is provided with a male part 27 that on insertion of the fluid line 2 enters from the end into the axially opposite signal conductors 7a and 7b and produces an electrical connection or contact with same. The connection member 1 may only one signal contact or several thereof.

Figure 6:
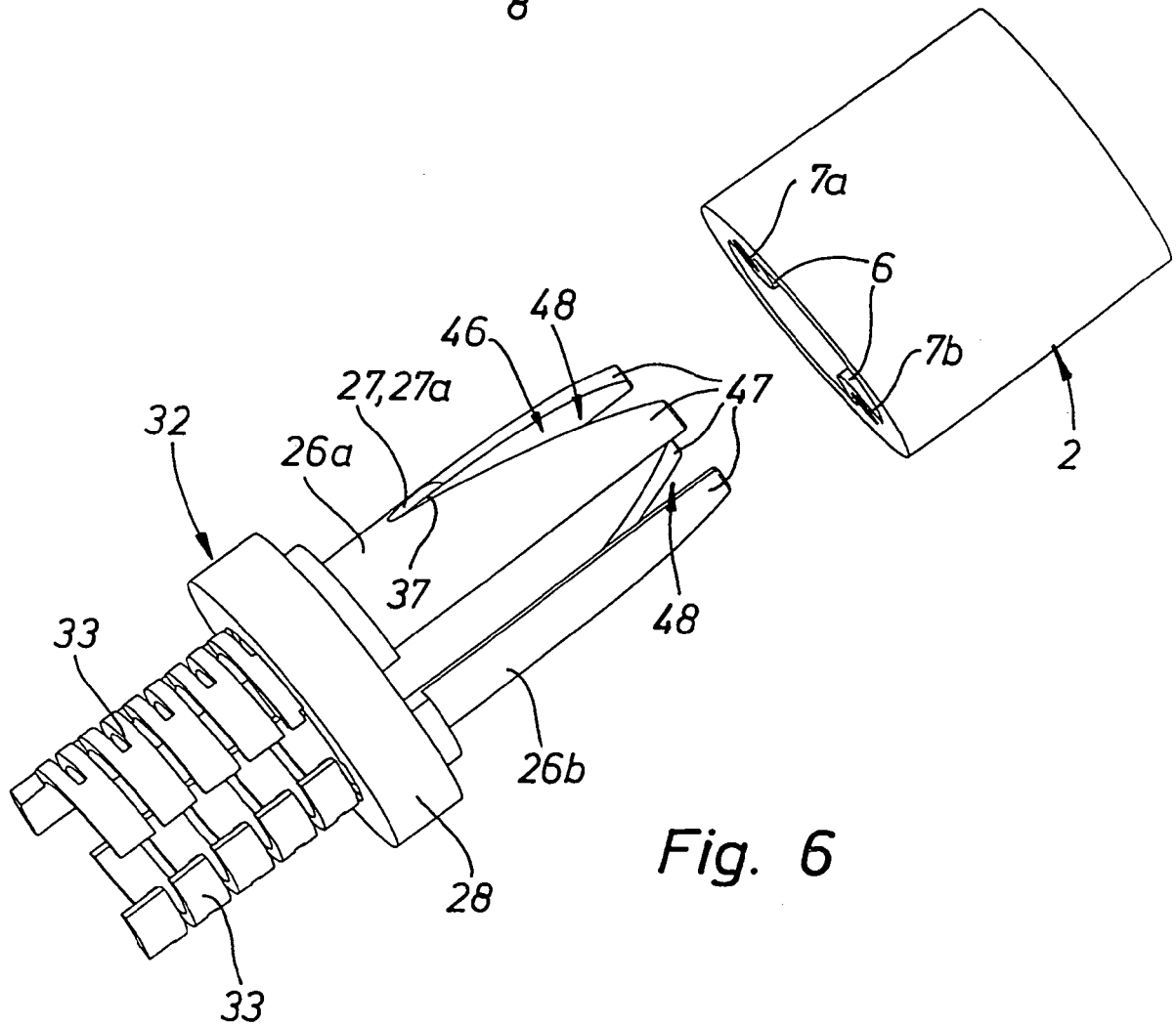
FIG. 6 is a separate view of the signal contact arrangement of the connection member in accordance with FIG. 4 in connection with the separately depicted end section of the fluid line to be connected.

In the working embodiment the signal contacts 26a and 26b are secured to an annular contact carrier 28, together with which they form an insert 32 separately illustrated in FIGS. 3, 6 and 7. This insert 32 is so placed in the housing 13 that the contact carriers 28 assume positions on the floor of the female socket 14.

It is convenient for the signal contacts 26a and 26b to be able to slide in the direction of the longitudinal axis 17 of the female socket 14 in relation to the housing 13. The ability to slide is in the working example in relation to the contact carrier 28 arranged stationarily in the housing 13. However, a design would be possible as well in the case of which the signal contacts 26a and 26b, together with the contact carrier 28, are able to be slid in relation to the housing 13.

The signal contacts 26a and 26b cooperate with the sliding support means by way of spring means 33 effective in the direction of the insertion opening 12. Preferably, each of the signal contacts 26a and 26b is provided with individual spring means 33. In the working embodiment the spring means 33 are respectively represented by axial spurs formed integrally with the respective signal contact 26a and 26b, which adjoin each other at the rear side, opposite to the male part, at the signal contacts 26a and 26b. These spurs are so designed that in the longitudinal extent a certain resiliently elastic compressibility is allowed for. In the working embodiment this is rendered possible by a meandering configuration of the spurs.

For insertion of a fluid line the spring means 33 are compressed because a thrust force is exerted on the signal contacts 26a and 26b. When during later operation of the connection member 1 relative axial movement takes place between the fluid line 2 and the housing 13, for example owing to a pulsed pressure effect, the signal contacts 26a and 26b, which have been stuck into the signal conductors 7a and 7b, are caused to follow up owing to the spring force of the spring means so that relative movement and resulting contact problems may be prevented.

The ends 34, opposite to the signal contacts 26a and 26b, extend some distance to the rear past the attachment section 22. Here they are contacted, or able to be contacted, by electrical connecting lines 35 indicated in chained lines, which lead to a functional component of the fluid power component 3, as for example to a sensor, a valve drive or an electronic control.

Since in the working example the spring means 33 are designed to be electrically conductive there is a continuous electrical connection between the signal lines 7a and 7b of the fluid line 2 and the connecting lines 35 of the fluid power component 3.

However, there is certainly the possibility of producing the electrical connection between the signal contacts 26a and 26b and the connecting line 35 some other electrical conductor.

In any case the connection member 1 in the manner described renders possible a combined electrical and fluid connection of a fluid line 2 fitted with electrical conductors 7a and 7b. For the necessary sealing use is made here of a sealing ring 36, which is placed in the female socket 14 and surrounds the inserted fluid line 2.

The fluid flowing through the fluid line 2 may be a gaseous fluid, more particularly compressed air, or a hydraulic fluid.

The angular arrangement of the signal contacts 26a and 26b within the female socket 14 is best selected in accordance with the distribution of the signal lines 7a and 7b. In the working embodiment the signal contacts 26a and 26b are placed diametrally opposite one another in the female socket 14.

The signal contacts 26a and 26b are characterized by a particularly advantageous of their male part 27. Same is constituted by a knife edge 27a, whose width is equal to at least the diameter of the stranded signal line 7a and 7b. On insertion of the fluid line 2 the knife edges, like a knife, penetrate into the respectively associated signal line 7a and 7b at the preceding cutting edge 37 and split it into a radially outward outer line limb 38 and a radially inner line limb 39.

Unlike a male part running to a point, the design as the knife edge 27a renders possible a substantially more accurate placement on insertion of the fluid line 2 even no special guide means are present, which favor insertion of the fluid line at a predetermined angular setting. There is the possibility of designing the width of the knife edge 27a to be larger than the diameter of the signal lines 7a and 7b so that there is a larger angular range available, within which reliable making o contact is ensured.

These advantages are also to be had in conjunction with fluid lines, in the case of which the signal lines 7a and 7b are embedded in a wall with a constant wall thickness. The design of the connection member 1 described is however more particularly advantageous in the case of fluid line 2 whose signal lines 7a and 7b, as in the working examples, have their entire cross section, or at least a part thereof, in the form of rib-like wall sections 6, which project inward and toward the fluid duct 5.

In the case of such a design the width of the knife edge 27a may be made relatively large without problems and without increasing the resistance to insertion and consequently the force necessary for insertion of the fluid line 2 to an excessive degree. This is achieved since the knife edges 27a are so arranged and designed that during insertion of the fluid line 2 at the rib-like wall section 6 they only strike the fluid line 2 and accordingly, to the extent that the wall 4 is concerned, they only sever the rib-like wall section 6. Those section of the knife edge 27a, which extend laterally past the rib-like wall section 6, are outside the fluid duct 5 and here do not meet with any physical resistance.

It is convenient for the width of the knife edge 27a to be so selected that it is at least equal to the width, as measured in the peripheral direction of the wall 4, but however is preferably larger than it. This means that on penetration of the edge 27a not only the signal line 7a and 7b is cut into two line limbs 38 and 39 but also simultaneously an inner section 42, lying radially within the edge 27a, of the rib-like wall section 6 is separated along a part of the its length from the remaining section of the wall 4.

If the signal contact 26a and 26b is so placed that it directly lies in the circularly shaped peripheral section of the fluid duct 5, the rib-like wall section 6 will be completely severed from the remaining section of the wall 4. In such a case it is necessary for the cross section of the associated signal conductor 7a and 7b to extend partly within the rib-like wall section 6 and partly in the wall section lying outside same.

Figure 2:
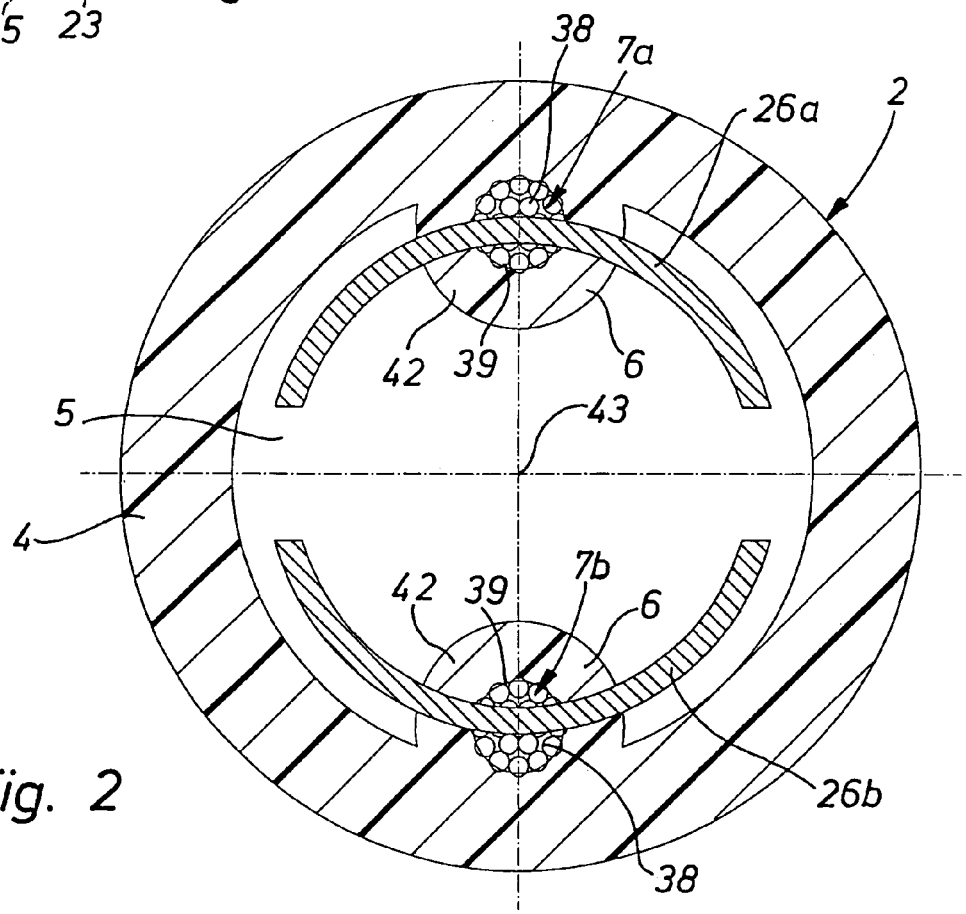
FIG. 2 shows a cross section taken on the section line II—II through arrangement depicted in FIG. 1, only the fluid line and two signal contacts being illustrated.

In the working embodiments of FIGS. 1 through 3 the knife edge 27a and preferably the entire signal contact 26a and 26b is curved in an arcuate fashion as seen looking from the end side, that is to say in the direction of the longitudinal axis 17. The center 43 of curvature preferably coincides with the longitudinal axis 17 of the female socket 14. In this manner it is particularly simple to select a configuration, in the case of which the knife edges 27a and 27b are within the diameter of the fluid duct 5.

Figure 5:
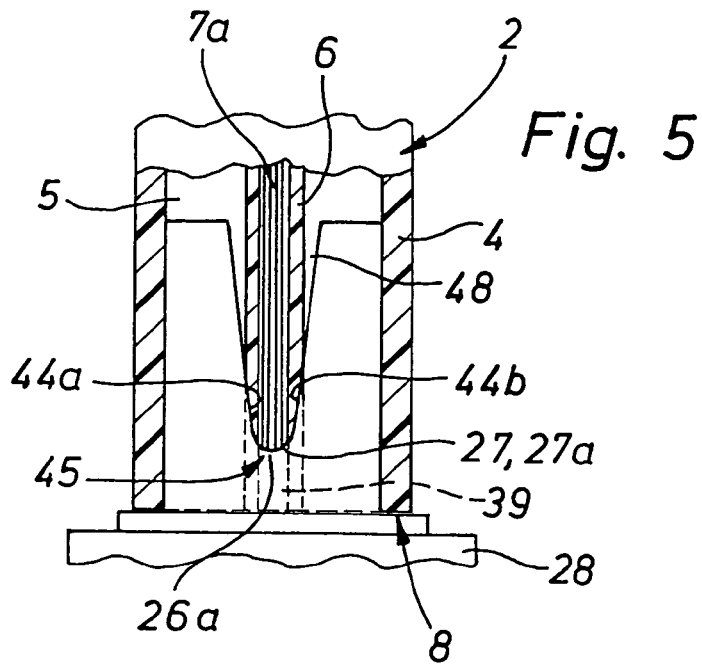
FIG. 5 shows a partial longitudinal section taken through the arrangement of FIG. 4, looking radially to show a view of a signal contact and the knife edge provided on same.

In the case of the working examples of FIGS. 4 through 6 the knife edge 27a is also circularly arcuate. On the other hand in the case of the design of FIGS. 7 and 8 it is linear and more particularly parallel to a tangent of the periphery of the female socket 14.

While the knife edge 27a in the case of the embodiments of FIGS. 1 through 3 and furthermore 7 and 8 has a linear form as seen radially—that is to say at a right angle to the longitudinal axis 17—in the case of the design of FIGS. 4 through 6 it has a concavely curved or V-like form. The latter form means that the knife edge 27a has two knife edge sections 44a and 44b opposite each other in the peripheral direction, whose distance apart decreases from a part near the female opening 12 toward a root part 45 farther removed from the insertion opening 12.

If in this case edge 27a penetrates the rib-like wall section 6, the latter will firstly be cut from the side with the leading edge sections 44a and 44b until finally the complete cut takes place through the root part 45. In the case of this design the resistance to cutting is particularly small and accordingly the operation of insertion of the fluid duct 2 is particularly free of effort.

The design of FIGS. 4 through 6 is furthermore, like the design of FIGS. 7 and 8, provided with guide means 46 to aid in insertion at the correct angle of the fluid line 2 and ensure that the fluid line 2 is put on in a predetermined angular position. The guide means 46 are in the design of FIGS. 4 and 6 constituted by two guide wings associated with each respective knife edge 27a, such wings 47 projecting toward the insertion opening 12 past the knife edge 27a to define a guide gap 48 widening toward the insertion opening 12. Such gap is directly adjacent to the knife edge 27a, its width being larger adjacent to front end than that of the rib-like wall section 6.

A fluid line 2 to be connected is so slipped over the guide wings 47 that the rib-like wall sections 6 fit in one respective one of the guide gaps 48. As the depth of penetration increases the rib-like wall sections 6 are so guided with simultaneously twisting of the fluid line 2 that their end meets the knife edge 27a.

The guide wings 47 and preferably an integral component of the respectively associated signal contact 26a and 26b.

In the case of the design of FIGS. 7 and 8 the guide means 46 are constituted by paired support wings 52, which are arranged respectively adjacent to one of the knife edges 27a. Preferably, they are placed radially within the knife edges 27a while however extending past same toward the insertion opening 12. Here they respectively define a guide channel with a V-like cross section, which on its long side is radially open.

On insertion of a fluid line 2 same is so angularly positioned that the rib-like wall sections 6 fit into one of the guide channels 53. On further insertion the rib-like wall sections 6 slide along the guide channels 53 until their end side meets the knife edges 27a lying on the path of insertion.

After the knife edges 27a have stuck into the rib-like wall sections 6 including an inner line limb 39 has been split off, the support wings 52 act in a supporting manner from the inside on the split off components and thrust same radially outward so that the inner line limb 39 is held firmly in contact with the knife edge 27a or, respectively, the adjoining section of the signal contact 26a and 26b.

The support wings 52 are preferably resiliently elastic in design.

All embodiments have the common feature that the knife edge on its outer side has a cutting flank 54, which runs obliquely inward in relation to the knife edge 37. This means that the flexible fluid line 2 is widened radially on slipping it onto the signal contacts 26a and 26b so that the outer line limb 38 is pressed home on the part, adjoining the knife edge 27a, of the signal contact 26a and 26b.

The working examples offer the advantage that owing to the selected width of the knife edge 27a an accurate angular positioning of the fluid line 2 is not necessary in relation to the connection member 1. Accordingly during manufacture tolerances need not be so strict, this permitting economies in production.

The invention claimed is:

1. A connection member for a fluid line containing a fluid duct, in whose wall at least one stranded signal conductor provided for the transmission of electrical signals extends, comprising a female socket, having an insertion opening, for the insertion of the fluid line, a holding device disposed in said female socket for holding the inserted fluid line and at least one signal contact arranged in the female socket and extending toward the insertion opening, said signal contact having a male part adapted to stick into a signal conductor on insertion of the fluid line with the production of an electrical connection, wherein the male part of the at least one signal contact is constituted by a knife edge, whose width is equal to at least the diameter of the signal conductor to be contacted and which on penetration from the end is adapted to split the signal conductor into an externally placed and an internally placed line limb.

2. The connection member as set forth in claim 1, wherein the knife edge is straight as seen in an end-on view.

3. The connection member as set forth in claim 1, wherein the knife edge as seen in an end-on view is circularly arcuate, the center of curvature coinciding with the longitudinal axis of the female socket.

4. The connection member as set forth in claim 1, wherein the knife edge has a cutting flank on an outer side thereof, the cutting flank extending obliquely inward in relation to the cutting edge.

5. The connection member as set forth in claim 1, wherein the knife edge, as seen looking radially, has a straight form at a right angle to the longitudinal axis of the female socket.

6. The connection member as set forth in claim 1, wherein the knife edge, as seen looking radially, has a concavely curved bayed configuration.

7. The connection member as set forth in claim 1, wherein the at least one signal contact has two opposed guide wings projecting toward the insertion opening past the knife edge such wings defining a guide gap, widening toward the insertion opening, for receiving a rib-like wall section of the fluid line.

8. The connection member as set forth in claim 1, wherein the at least one signal contact has at least one support wing arranged adjacent to the knife edge, such wing in the inserted state of the fluid line being fitted under the radially inner line limb and pressing same against the signal contact.

9. The connection member as set forth in claim 8, wherein the at least one signal contact has two support wings arranged alongside each other in the longitudinal direction, which define a guide channel provided to receive a rib-like wall section of the fluid line.

10. The connection member as set forth in claim 1, wherein the width of the knife edge is larger than the diameter of the signal conductor to be contacted so that the edge sticks into the fluid line's wall section surrounding the signal conductor as well on insertion.

11. The connection member as set forth in claim 1 wherein the connection member is designed for connection of a fluid line whose at least one electrical signal conductor extends so that at least one part of its cross section is in a radially inwardly projecting rib-like section of the wall.

12. The connection member as set forth in claim 11, wherein the knife edge is so arranged and designed that, on plugging in the fluid line, it sticks into its rib-like wall section and severs same at least partially along a part of its length from the remaining wall section.

13. The connection member as set forth in claim 1, further comprising at least two signal contacts spaced apart in the peripheral direction, which are diametrically opposite one another.

14. The connection member as set forth in claim 1, wherein the at least one signal contact is able to slide in the direction of the longitudinal axis of the female socket and includes spring means, which may thrust it toward the insertion opening.

15. The connection member as set forth in claim 1, wherein the at least one signal contact is fixed on a contact carrier and together with same constitutes an insert inserted into the housing of the connection member.

16. The connection member as set forth in claim 1, wherein the fluid duct is hose-like in configuration.

17. The connection member as set forth in claim 1, wherein said signal contact further includes guide means for aiding insertion of the fluid line at a predetermined angular position.

18. A connection member for a fluid line having a signal conductor disposed in a wall thereof the connection member comprising:

a female socket having an insertion opening for receiving the fluid line;

a holding device disposed in said female socket for holding the fluid line in said female socket; and a signal contact disposed in said female socket for making electrical connection with the signal conductor disposed in the wall of the fluid line, said signal contact including a knife edge having a cutting length equal to at least the diameter of the signal conductor and being adapted to split an end of the signal conductor into two separate portions upon penetration of the knife edge into the signal conductor end.

* * * * *